(12) United States Patent
Schuknecht et al.

(10) Patent No.: US 11,955,926 B2
(45) Date of Patent: Apr. 9, 2024

(54) TORQUE TUBE INTERFACE WITH BIFURCATED BEARING HOUSING

(71) Applicant: ARRAY TECHNOLOGIES, INC., Albuquerque, NM (US)

(72) Inventors: Nathan Schuknecht, Golden, CO (US); Kevin Krautbauer, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 18/315,168

(22) Filed: May 10, 2023

(65) Prior Publication Data
US 2024/0039460 A1 Feb. 1, 2024

Related U.S. Application Data

(60) Provisional application No. 63/369,461, filed on Jul. 26, 2022.

(51) Int. Cl.
*H02S 20/32* (2014.01)
*F16C 17/02* (2006.01)

(52) U.S. Cl.
CPC ............. *H02S 20/32* (2014.12); *F16C 17/02* (2013.01)

(58) Field of Classification Search
CPC ...... Y02E 10/47; F24S 2030/15; F24S 30/425
USPC ........................................................ 126/571
See application file for complete search history.

(56) References Cited

U.S. PATENT DOCUMENTS

| | | | |
|---|---|---|---|
| 5,918,491 A * | 7/1999 | Maxwell | G07F 9/06 70/164 |
| 8,418,686 B1 | 4/2013 | Liao | |
| 8,939,648 B2 | 1/2015 | Schneider et al. | |
| 9,035,168 B2 | 5/2015 | Barton | |
| 9,206,999 B2 * | 12/2015 | Reed | F24S 25/70 |
| 9,455,664 B2 | 9/2016 | Barton | |
| 9,482,449 B2 | 11/2016 | Cole et al. | |
| 9,806,669 B2 | 10/2017 | Michotte De Welle | |

(Continued)

FOREIGN PATENT DOCUMENTS

| | | |
|---|---|---|
| KR | 100900209 B1 | 5/2009 |
| WO | 2013/003737 A2 | 1/2013 |

(Continued)

OTHER PUBLICATIONS

International Search Report and Written Opinion dated Oct. 4, 2023 in connection with PCT Application No. PCT/US2023/025571, 13 pgs.

*Primary Examiner* — Vivek K Shirsat
(74) *Attorney, Agent, or Firm* — MASCHOFF BRENNAN

(57) ABSTRACT

A bifurcated bearing housing for use within a torque tube interface may include a first component defining a first portion of an aperture configured to house a first portion of a rotating bearing, a second component defining a second portion of the aperture configured to house a second portion of the rotating bearing, and a connection interface between the first and second components, wherein, when the first and second components are in an attached configuration, the connection interface lies below a centerpoint of the aperture defined by the first and second components. The bifurcated bearing housing may include one or more of ridges, gussets, and/or hems to increase the structural integrity and rigidity of the bearing housing.

27 Claims, 13 Drawing Sheets

(56) References Cited

U.S. PATENT DOCUMENTS

| | | |
|---|---|---|
| 10,097,134 B2 | 10/2018 | Molina et al. |
| 10,584,902 B2 | 3/2020 | Ros Ruiz et al. |
| 10,944,354 B2 | 3/2021 | Ballentine et al. |
| 2012/0219243 A1 | 8/2012 | Jang |
| 2015/0059826 A1 | 3/2015 | Reed et al. |
| 2015/0207452 A1 | 7/2015 | Werner et al. |
| 2018/0347859 A1 | 12/2018 | Ros Ruiz et al. |
| 2019/0068112 A1 | 2/2019 | Gnanapa et al. |
| 2019/0383521 A1 | 12/2019 | Von Behrens et al. |
| 2021/0194418 A1 | 6/2021 | Ballentine et al. |
| 2022/0057113 A1 | 2/2022 | Sasidharan et al. |
| 2022/0085753 A1 | 3/2022 | Kumar et al. |
| 2022/0149773 A1 | 5/2022 | Reznar et al. |
| 2022/0190777 A1* | 6/2022 | Taha ............... F16B 7/0406 |

FOREIGN PATENT DOCUMENTS

| | | |
|---|---|---|
| WO | 2016/066010 A1 | 5/2016 |
| WO | 2020/260736 A1 | 12/2020 |
| WO | 2022/056471 A1 | 3/2022 |

* cited by examiner

TORQUE TUBE INTERFACE WITH BIFURCATED BEARING HOUSING

CROSS-REFERENCE TO RELATED APPLICATION

This application claims priority under 35 U.S.C. § 119 to U.S. Provisional Application No. 63/369,461, filed Jul. 26, 2022, the entire disclosure of which is incorporated herein by reference.

TECHNICAL FIELD

The present disclosure relates to a torque tube interface, and in particular, to a bifurcated bearing housing for use in mounting photovoltaic (PV) modules to a support structure.

BACKGROUND

Each of the PV modules in solar panel systems may be attached to a support structure, or pile. The PV modules may be mounted in rows on solar trackers that direct an orientation of the PV modules such that the angle of the PV modules with respect to the support structure changes throughout the day. Changing the angle of the PV module with respect to the support structure enables the PV module to track the location of the sun and maximize efficiency. Often, a large number of PV modules are mounted to a single torque tube, which is secured to one or more piles or other support structures, through one or more torque tube interfaces. Torque tube interfaces often include both a bearing and bearing housing. The bearings are often configured to rotate with the torque tube within the bearing housing.

While changing an angle of a PV module to track the location of the sun can increase the efficiency of the PV module, it can also create interference points between the PV module and flanges on the torque tube interface that are used to mount the PV module to a support structure. For example, when modules extend over the torque tube interface, mounting flanges on the torque tube interface may prevent the PV module from being positioned at an angle that would most efficiently capture sunlight during the morning or evening hours, or when the PV module is positioned closest to vertical.

In addition, due to a variety of contributing factors, including the weight of the PV modules mounted to a single torque tube, seismic activity, and environmental conditions such as wind, a large amount of stress can be placed on torque tube interfaces. This stress can lead to failure, breakage, and the need to repair or replace one or both of the bearings and bearing housings in torque tube interfaces. Often, bearings and bearing housings are unitary structures that cannot be separated into multiple pieces. In order to install or remove these unitary torque tube interfaces, the bearings and bearing housings must be threaded through one end of a torque tube.

Bearings and bearing housings that have unitary structure designs can lead to significant inefficiencies and costs. For example, replacing a damaged torque tube interface that is in the middle of line of PV modules on a torque tube would require removing all of the PV modules and torque tube interfaces between the damaged torque tube interface and one end of the torque tube so that a new bearing and/or bearing housing may be threaded through the torque tube and back to the location of the replaced torque tube interface. Unitary bearing and bearing housing structures also create inefficiencies and increased costs during an initial installation of a solar panel system as unitary structures may require a PV module and a unitary structure to be coupled during installation.

Accordingly, there is a need for a torque tube interface that does not interfere with a PV module when the PV module is positioned at angles that would most efficiently capture sunlight during the morning or evening hours, or when the PV module is positioned closest to vertical. There is also a need to increase the structural rigidity and strength of torque tube interfaces. Finally, there is a need for a design of torque tube interfaces that would allow them to be installed and removed from a torque tube without needing to be threaded through one end of the torque tube.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional solar panel tracking systems, including problems associated with interference points between a PV module and a portion of a bearing housing (such as a mounting flange) that may prevent the PV module from being positioned at certain angles. Embodiments disclosed herein address this issue by providing a bifurcated bearing housing that includes an upper component and a lower component that define an aperture in which a bearing is positioned. Mounting flanges of the upper and lower components of the bifurcated bearing housing may be lowered so that a plane on which these mounting flanges interface is below a centerpoint of the aperture defined by the upper and lower bearing housing components. In some embodiments, the plane on which the interface lies may be below the bearing aperture that is defined by the first and second components such that it does not intersect the bearing aperture.

In addition, an interface between the bifurcated bearing housing and a support structure may also lie on a plane that is below a centerpoint of the aperture defined by the upper and lower bearing housing components. In some embodiments, the plane on which the interface lies may be below the bearing aperture such that it also does not intersect the bearing aperture. By lowering the level of these interfaces, sufficient space may be created for the PV module to rotate to angles that most efficiently capture sunlight during morning and evening hours, when the PV module is positioned closest to vertical.

Exemplary embodiments of the present disclosure also address problems associated with failure and breakage of bearing housings that may result from the amount of stress that is focused on these structures. Lowering the level of the mounting flanges of upper and lower components in a bifurcated bearing housing may increase load and stress on the bearing housing. Embodiments disclosed herein address this issue through the use of one or more features that increase the structural integrity of a bearing housing. For example, embodiments of the bearing housings described herein may include one or more structural ridges, gussets, or hems. These features may provide additional strength and rigidity to bearing housings to avoid damage and failure from stress caused by the location of the mounting flanges, weight of the components, seismic activity, weather events, and other environmental conditions.

Exemplary embodiments of the present disclosure also address problems associated with the inefficiencies created by bearings and bearing housings that have unitary structure designs. Embodiments disclosed herein address this issue by providing a bifurcated bearing housing that includes an upper and lower component and a bifurcated bearing that also includes an upper and lower component. By separating these structures into multiple pieces, they may be removed from a torque tube and repaired or installed without the need to thread these structures to an end of the torque tube.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
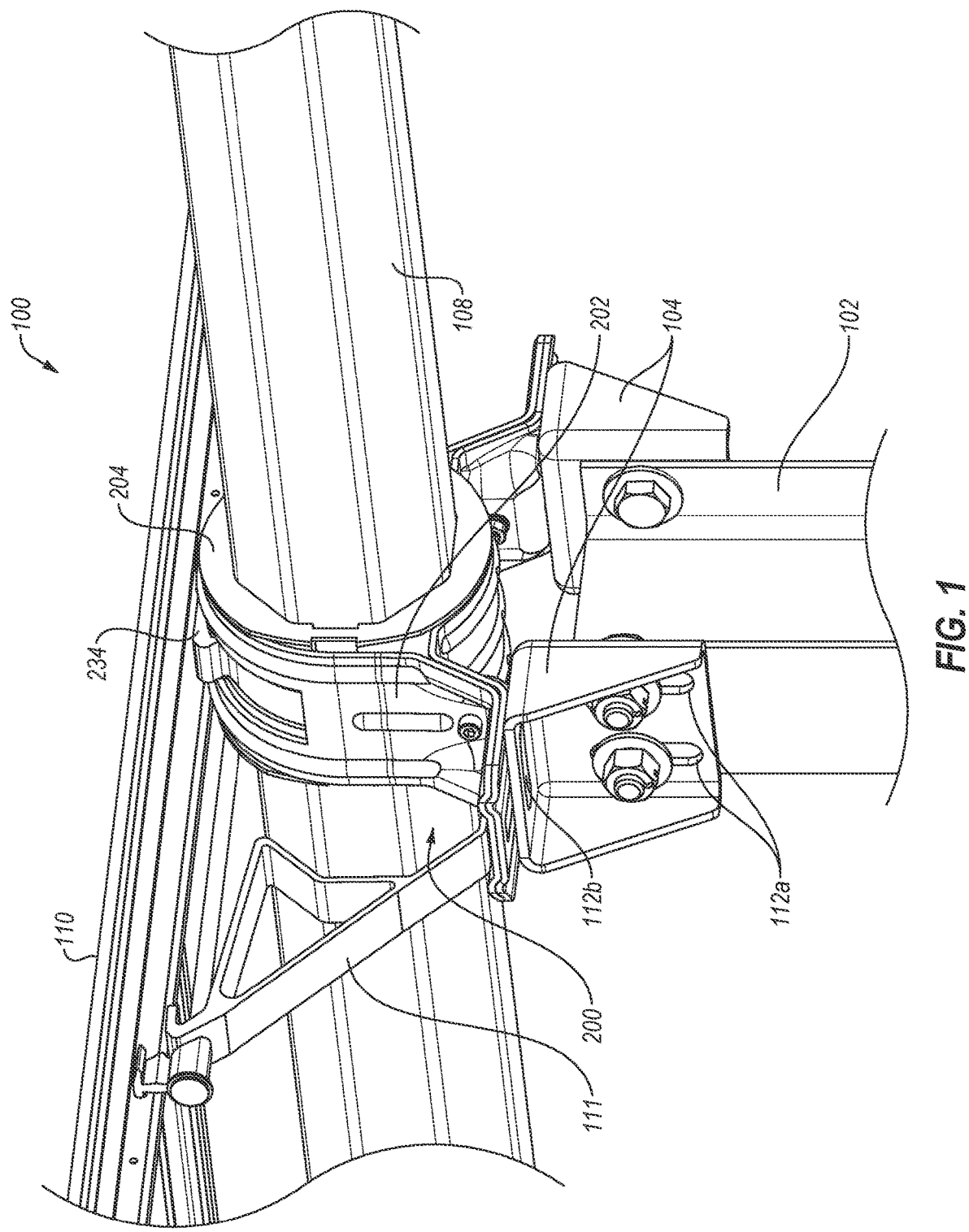
FIG. 1 illustrates an exemplary system for mounting PV modules.

FIG. 1 illustrates an exemplary system 100 for mounting PV modules. The system 100 includes a support structure or pile 102, brackets 104, a torque tube interface 200, a torque tube 108, a PV module 110, and a module bracket 111. The brackets 104 may be secured to the pile 102 through one or more mounting slots 112a that allow the brackets 104 to be movable up and down relative to the position of the torque tube interface 200 and pile 102. Similarly, the tops of the brackets 104 may also include mounting slots 112b going in one direction while corresponding mounting slots on the torque tube interface (slots shown in FIGS. 2A, 2B, 2E, and 2F) may go in a substantially opposite direction to allow greater flexibility in positioning the torque tube interface 200 relative to the pile 102. In some embodiments, the pile 102 may also include mounting slots that correspond with the mounting slots 112a to provide a similar type of adjustability.

The torque tube interface 200 may include a bearing housing 202 and a rotating bearing 204. In some embodiments, the rotating bearing 204 may be operatively coupled to the bearing housing 202 in a way that allows the rotating bearing 204 some rotational freedom within the bearing housing 202. As provided in more detail below, the amount of this rotational freedom may be limited by a mechanism, such as a stop 234. Other embodiments of the torque tube interface may lack a stop, thus enabling the rotating bearing 204 to spin a full 360 degrees within the bearing housing 202.

In some embodiments, lateral movement by the rotating bearing 204 within the bearing housing 202 may be substantially restricted. The bearing housing 202 can be manufactured from any suitable material, including but not limited to plastic or a metal, such as aluminum and steel. In some embodiments, sheets of pre-treated metal, such as galvanized steel, may be used which may allow for more robust components and/or greater flexibility in manufacturing and cost savings in manufacturing. Additionally or alternatively, such a material may allow for low-friction coatings to be applied to the steel prior to the forming process, thereby reducing cost.

The rotating bearing 204 may be fixedly coupled to the torque tube 108. Allowing the bearing 204 to rotate within the bearing housing 202 also allows rotational movement of the torque tube 108 relative to the pile 102. Permitting rotation of the torque tube 108 within the bearing housing 202 allows the PV module 110, which may also be fixedly coupled to the torque tube 108 through the module bracket 111, to rotate with the torque tube 108 in order to track the position of the sun as it moves across the sky. In some embodiments, a plurality of PV modules may be fixedly coupled to the torque tube 108 in the manner shown in system 100.

While changing an angle of a PV module to track the location of the sun can increase the efficiency of the PV module, it can also create interference points between the PV module and a bearing housing when the module extends over the bearing housing. As described in more detail below, the bearing housing 202 includes features that avoid interference with the PV module 110, so that sufficient space exists for the PV module 110 to rotate to angles that most efficiently capture sunlight during morning and evening hours, when the PV module 110 is positioned closest to vertical. In addition, the bearing housing 202 also includes structural features that increase its rigidity and strength. Finally, the bearing housing 202 and the bearing 204 can be separated into multiple pieces to facilitate installation and removal from the torque tube 108.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. For example, in some embodiments, a torque tube interface may include a bearing housing only and lack a separate rotating bearing. In these embodiments, a torque tube may rotate directly within a bearing housing. The bearing housing may include a lubricant coating to facilitate rotation by the torque tube. Alternatively, a torque tube interface may include a bearing that remains in a fixed position relative to the bearing housing. In this embodiment, a torque tube may be configured to rotate within the bearing.

Figure 2A:
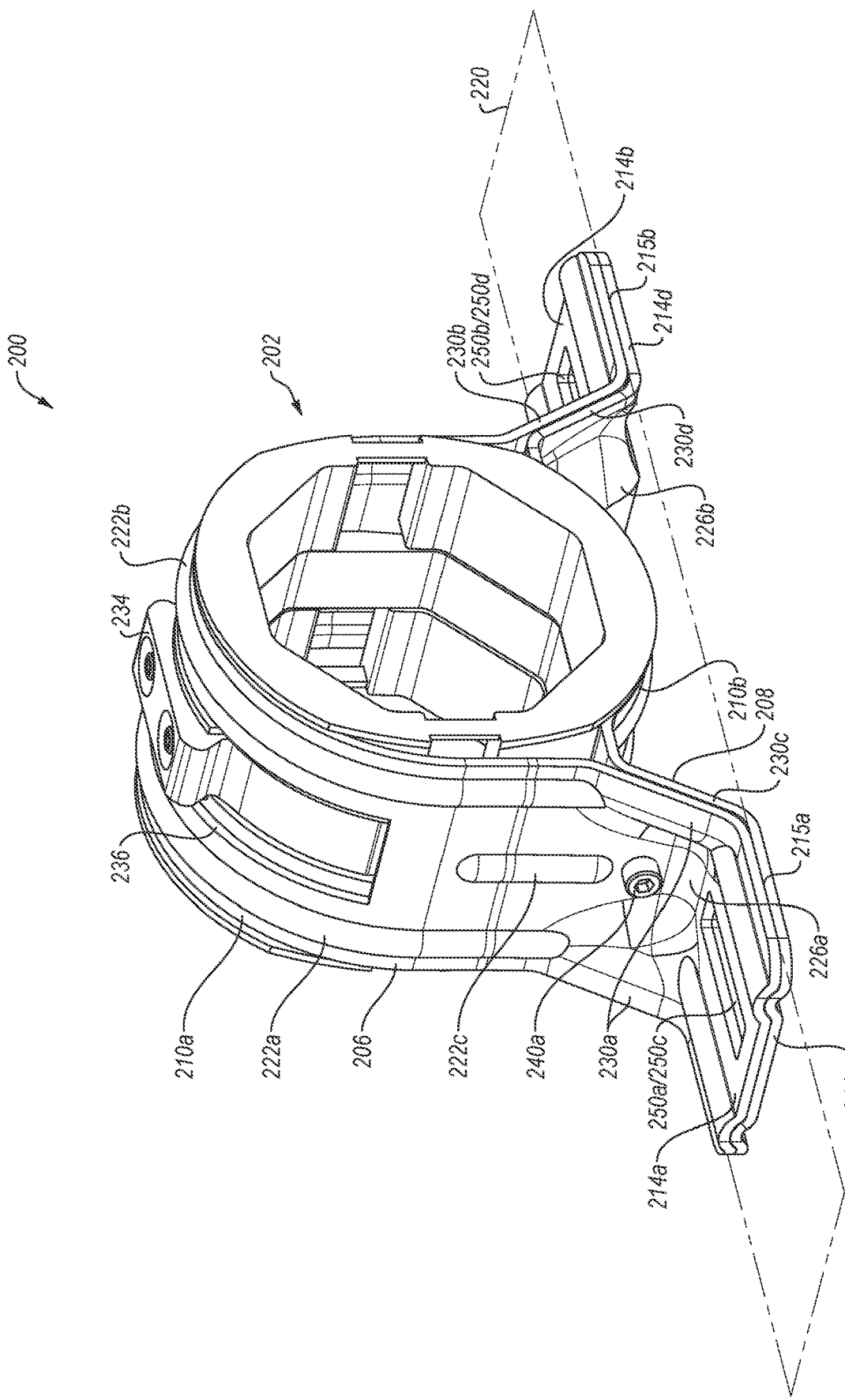
FIGS. 2A-2F illustrate various views of the torque tube interface shown in FIG. 1.
Figure 2B:
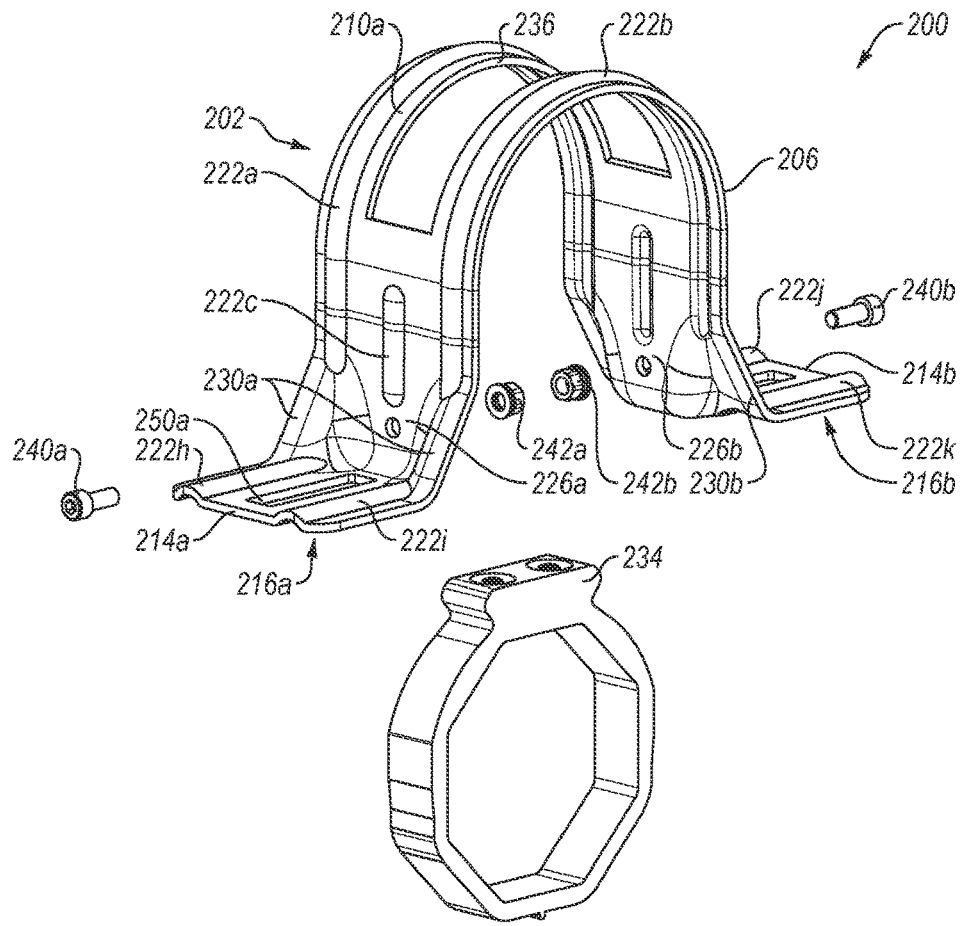
Figure 2C:
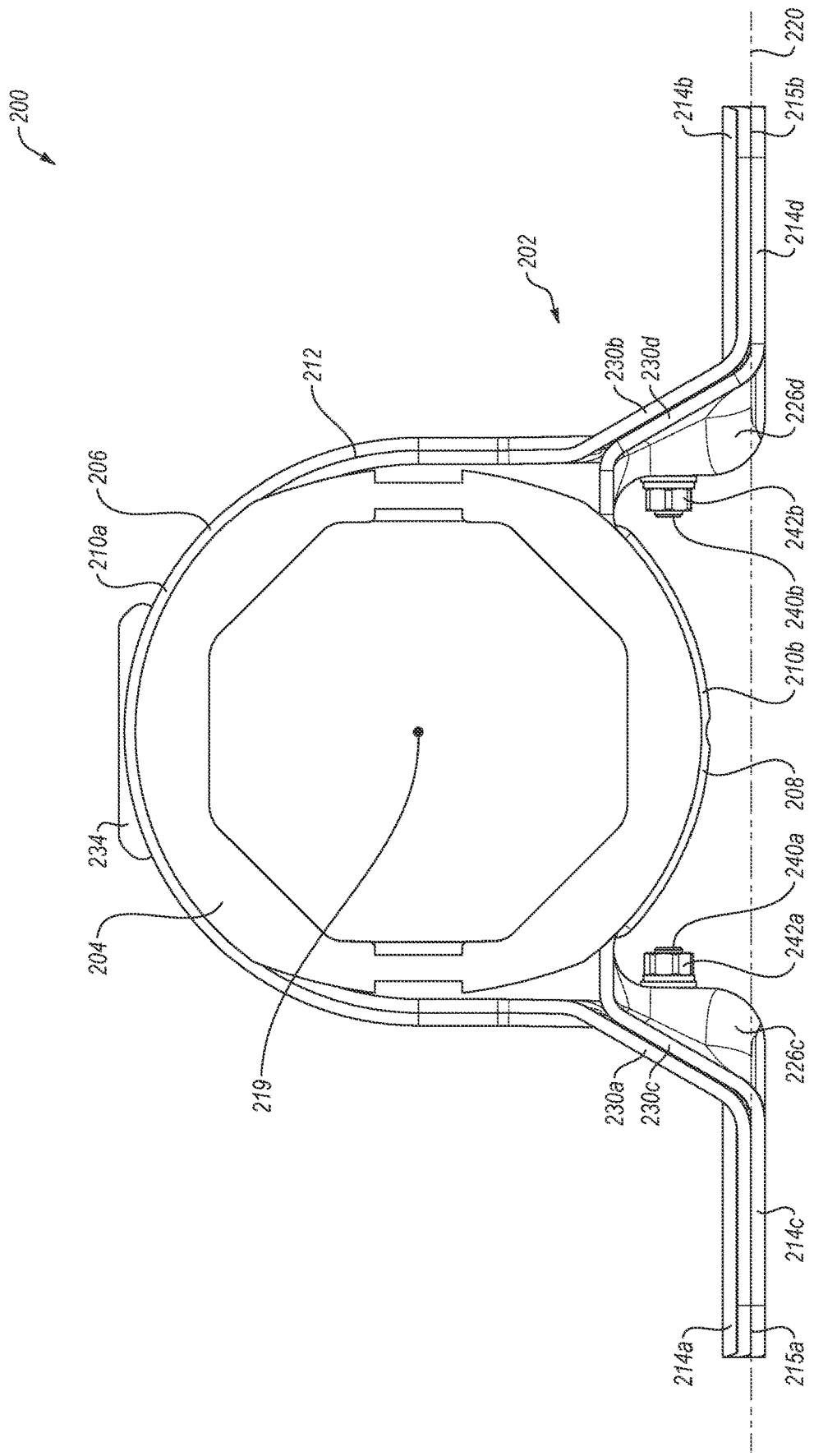
Figure 2D:
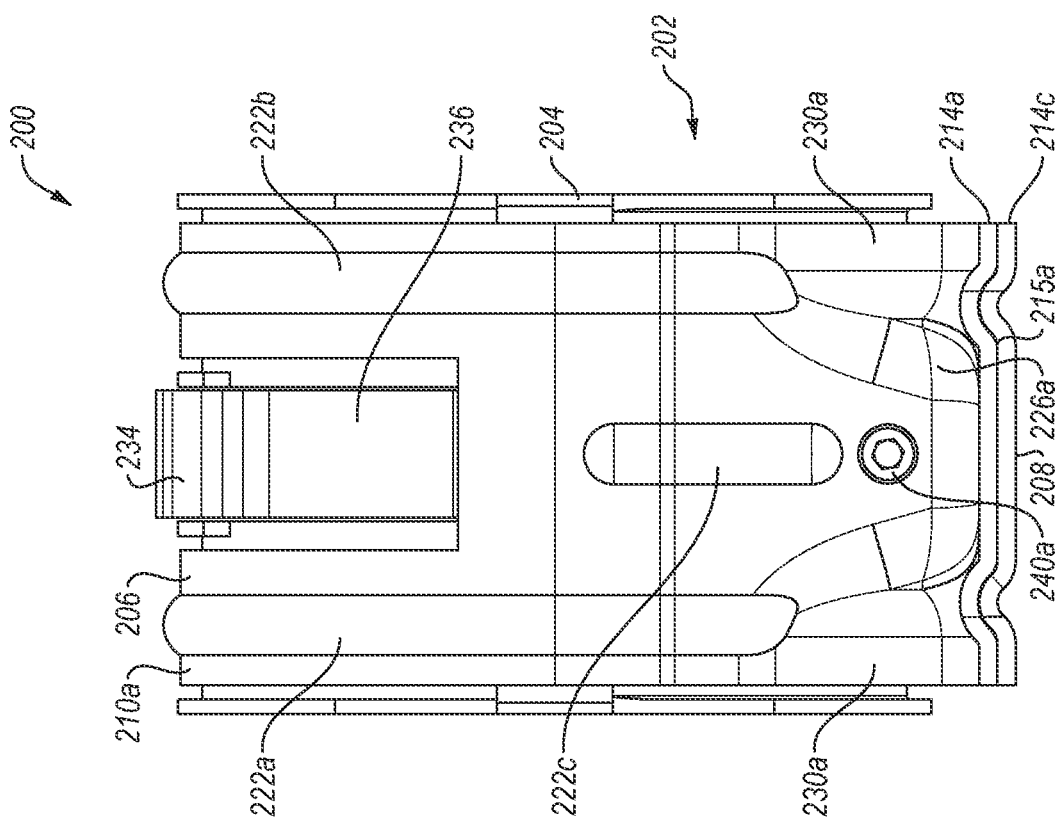
Figure 2E:
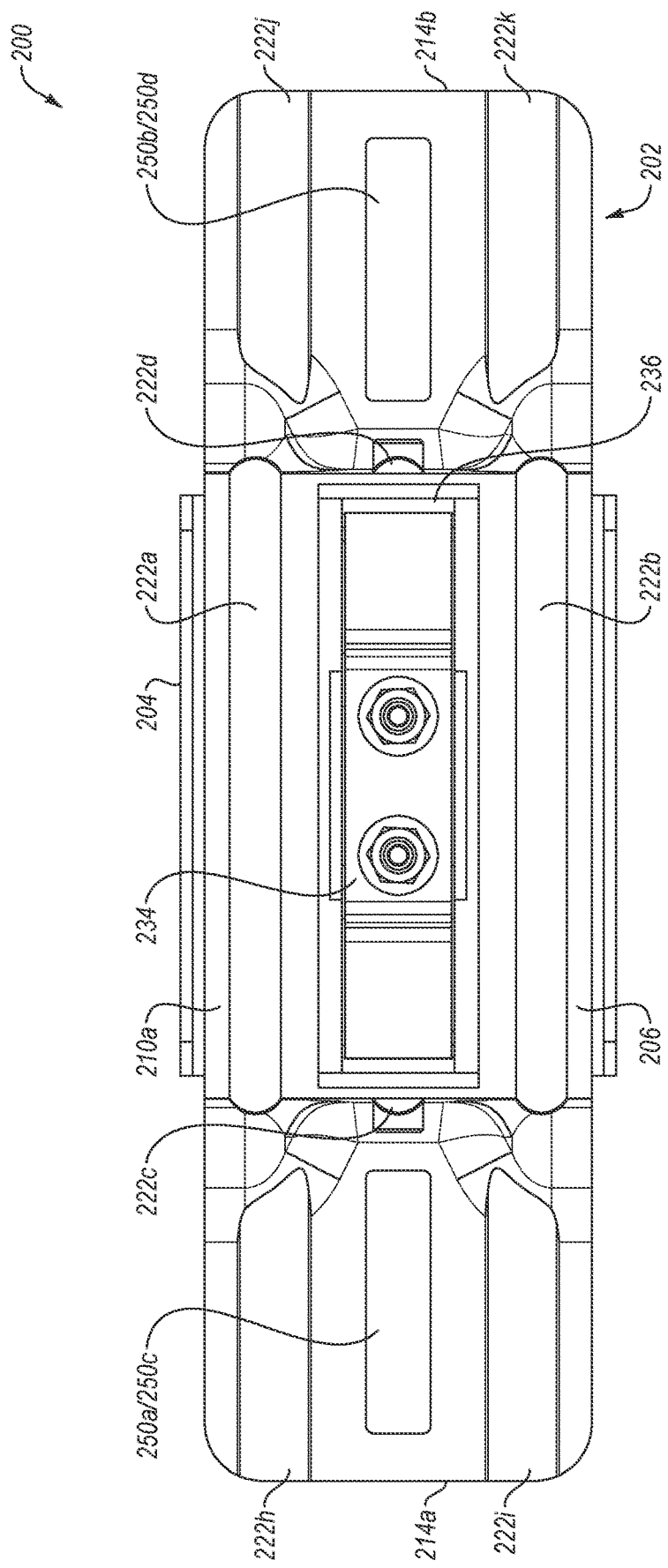
Figure 2F:
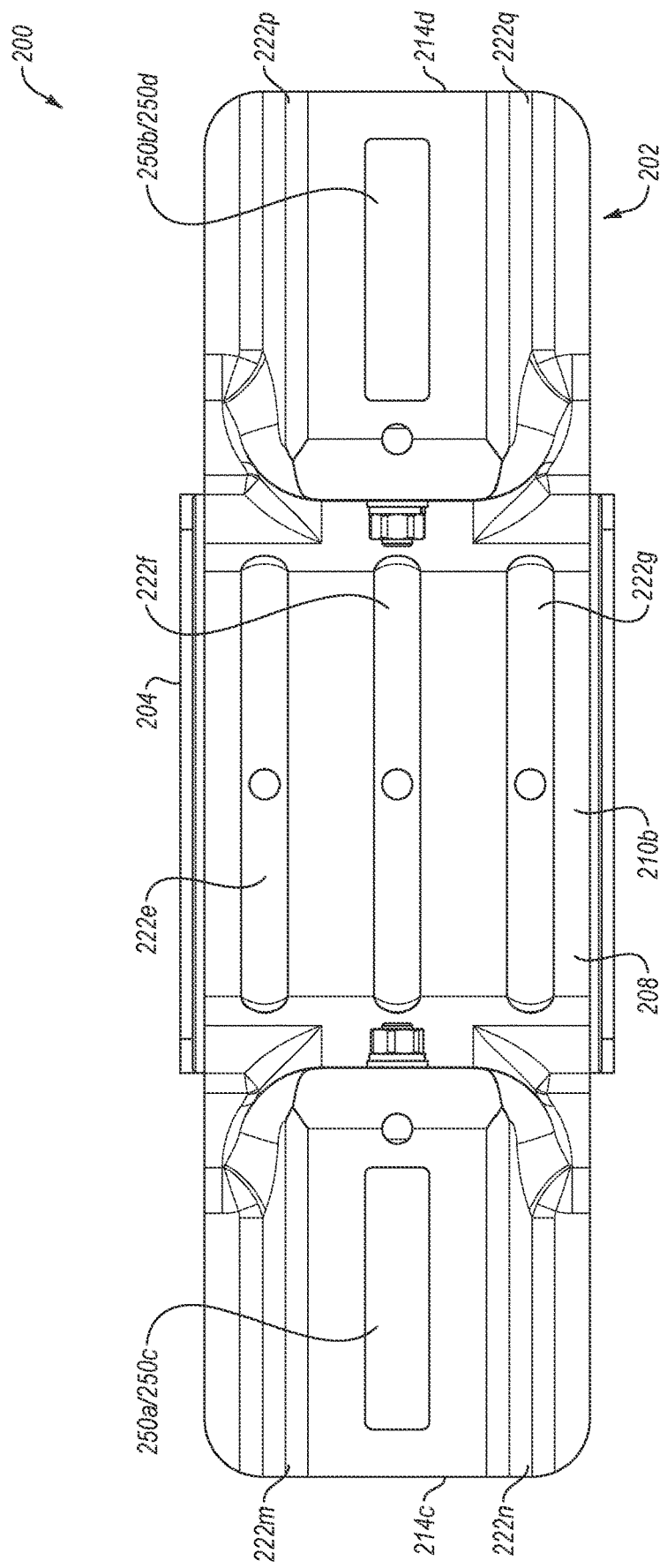

FIGS. 2A-2F illustrate different views of the torque tube interface 200 shown in FIG. 1, in accordance with one or more embodiments of the present disclosure. Specifically, FIG. 2A illustrates an isometric view of the torque tube interface 200, FIG. 2B illustrates an exploded view of the torque tube interface 200, FIG. 2C illustrates a front view of the torque tube interface 200, FIG. 2D illustrates a side view of the torque tube interface 200, FIG. 2E illustrates a top view of the torque tube interface 200, and FIG. 2F illustrates a bottom view of the torque tube interface 200.

As can be seen in FIGS. 2A-2F, the bearing housing 202 of the torque tube interface 200 is a bifurcated housing that includes an upper component 206 and a lower component 208. The upper and lower components 206 and 208 may be selectively attached (as shown in FIGS. 2A, 2C, 2D, and 2E) and separated (as shown in FIG. 2B). Having upper and lower components 206 and 208 that are selectively detachable allows the bearing housing 202 to be removed from a torque tube at any point on the torque tube. Thus, the bearing housing 202 does not need to be threaded through one end of a torque tube in order to be installed, which is the case for many bearing housings that cannot be separated into pieces. The bearing housing 202 also does not need to be threaded through one end of a torque tube in order to be removed, to be replaced or repaired, for example.

A bearing housing may define an all or part of an aperture, within which a bearing may be secured or housed. For example, the upper component 206 of bearing housing 202 includes a first aperture defining portion 210a. The lower component 208 of bearing housing 202 includes a second aperture defining portion 210b. When the upper and lower components 206 and 208 are in an attached configuration, the first and second aperture defining portions 210a and 210b define an aperture 212 that secures the rotating bearing 204 within the bearing housing 202, as described herein. The aperture 212 has a centerpoint 219 (shown in FIG. 2C) that is in the middle of the aperture 212. The centerpoint 219 also lies on the axis of rotation of the rotating bearing 204, which rotates within the bearing housing 202.

In some embodiments, the rotating bearing 204 may also be selectively separated into two or more pieces so that, like the bifurcated bearing housing 202, it can also be removed from a torque tube at any point on the torque tube. For example, attachment tabs 205 on rotating bearing 204 may be cut or removed in order to separate the rotating bearing 204 into two separate pieces. The rotating bearing 204 may be operatively coupled to the bearing housing 202 such that it can rotate with a torque tube within the bearing housing 202.

A bearing housing may include one or more mounting flanges. For example, the bearing housing 202 of torque tube interface 200 includes four mounting flanges. Specifically, the upper component 206 includes a first mounting flange 214a and a second mounting flange 214b. The lower component 208 includes a third mounting flange 214c and a fourth mounting flange 214d. The mounting flanges 214a, 214b, 214c, and 214d may extend laterally away from the first and second aperture defining portions 210a and 210b. For example, in the top view of the torque tube interface 200 shown in FIG. 2E, the mounting flanges 214a and 214b (and mounting flanges 214c and 214d, which are positioned below the mounting flanges 214a and 214b) extend laterally, and in opposite directions, away from the aperture created by the first and second aperture defining portions 210a and 210b. Providing the mounting flanges 214a, 214b, 214c, and 214d in this configuration may facilitate coupling the bearing housing to one or more mounting brackets, such as mounting brackets 104 in FIG. 1, as there is sufficient space directly above the mounting flanges 214a, 214b, 214c, and 214d to insert a screw or bolt into an underlying mounting bracket.

When the upper component 206 is in an attached configuration with the lower component 208, a connection interface 215a may exist between a lower surface 216a of mounting flange 214a and an upper surface 218a of mounting flange 214c. Similarly, a connection interface 215b may exist between a lower surface 216b of mounting flange 214b and an upper surface 218b of mounting flange 214d.

Connection interfaces between upper and lower components in a bifurcated bearing housing may lie on one or more planes. In some embodiments, where there are two or more connection interfaces between upper and lower components, the connection interfaces may lie on the same plane, or different planes. In some embodiments, upper and lower components of a bifurcated bearing housing may include only a single connection interface. This may be the case, for example, with bifurcated bearing housings that have only a single mounting flange on an upper component and a single mounting flange on a lower component.

With regard to the bifurcated bearing housing 202, the connection interfaces 215a and 215b lie on a single plane 220 (shown in FIGS. 2A and 2C). The plane 220 lies below the centerpoint 219 of the aperture 212. Indeed, the plane 220 does not intersect at all the aperture 212 or the rotating bearing 204. Thus, the plane 220 also lies below any torque tube that is secured within the rotating bearing 204.

Lowering the level of the connection interfaces between upper and lower components in a bifurcated bearing housing and/or a connection interface between a bearing housing and a support structure may provide additional space for a PV module that is connected to the bearing housing through a torque tube and a bearing to rotate. This is especially important if the PV module is part of a solar tracker system that is configured to track a position of the sun in the sky.

Figure 3A:
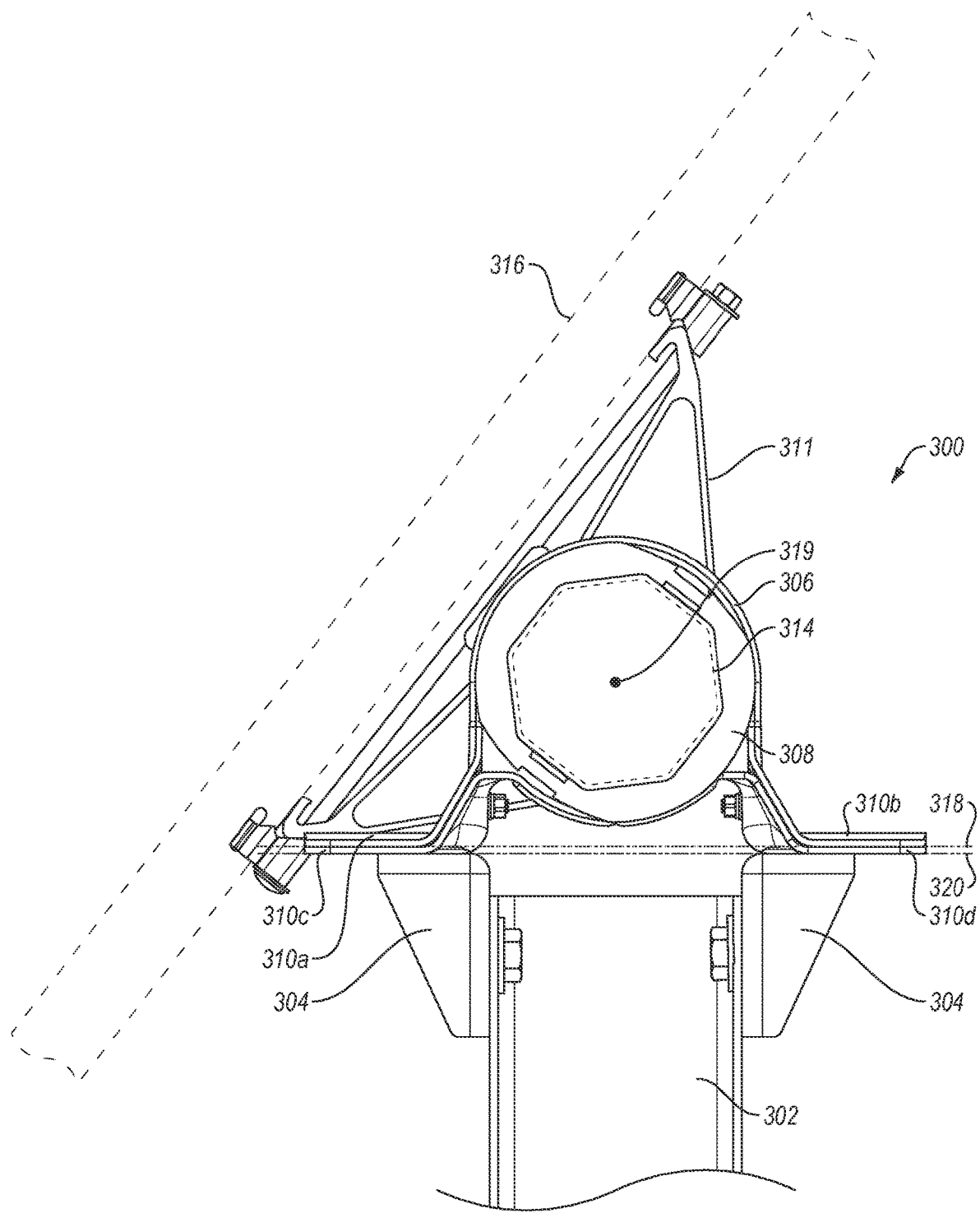
FIGS. 3A-3B illustrate side views of a torque tube interface secured to a support structure that has a PV module positioned in different angular orientations.
Figure 3B:
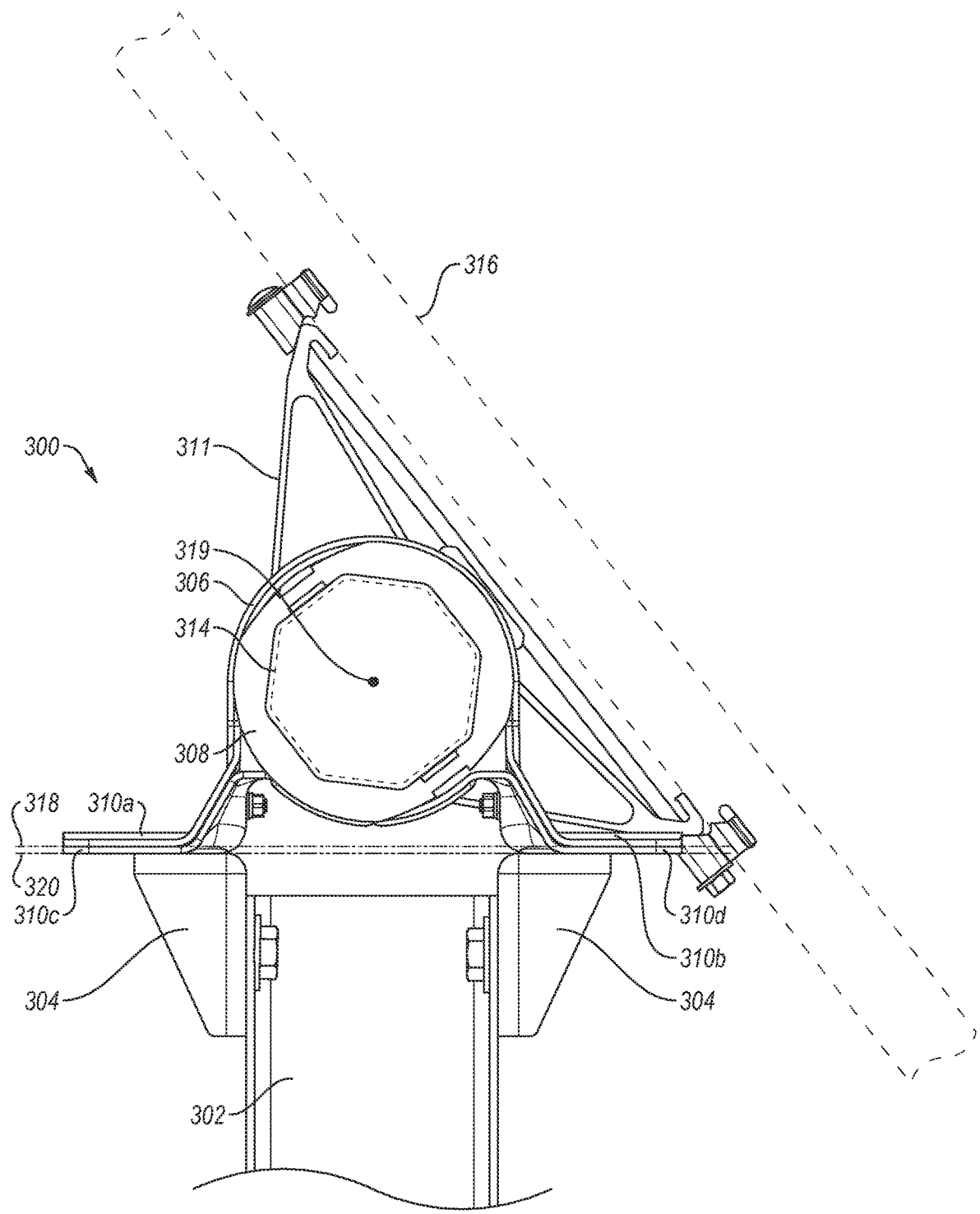

For example, FIGS. 3A and 3B illustrate a side view of a torque tube interface 300 that is part of a solar tracking system. The torque tube interface 300 is secured to a support structure 302 via brackets 304. The torque tube interface 300 includes a bearing housing 306 and a rotating bearing 308. A module bracket 311 fixedly couples a PV module 316 to the torque tube 314. Similar to the torque tube interface 200, the bearing housing 306 of the torque tube interface 300 may be a bifurcated bearing housing with and upper and a lower component. The bearing housing 306 includes a pair of mounting flanges 310a and 310b on the upper component, and a pair of corresponding mounting flanges 310c and 310d on the lower component. The connection interface between mounting flange 310a and 310c may lie on a plane 318. The connection interface between mounting flange 310b and 310d may also lie on the plane 318. An additional connection interface 320 may also exists between the mounting flanges 310c and 310d and the brackets 304, which are secured to the support structure 302. A torque tube 314 is secured within the rotating bearing 308.

The bearing housing 306 forms a aperture into which the rotating bearing 308 and the torque tube 314 are positioned. A centerpoint 319 lies in the middle of the aperture into which the rotating bearing 308 and the torque tube 314 are positioned. This centerpoint 319 also lies on the axis of rotation of the rotating bearing 308 and the torque tube 314.

In FIG. 3A, the torque tube 314 has rotated with the rotating bearing 308 inside of the bearing housing 306 so that the PV module 316 is oriented at an angle of approximately +52° relative to horizontal (0°). In FIG. 3B, the torque tube 314 has rotated with the rotating bearing 308 inside of the bearing housing 306 so that the PV module 316 is oriented at an angle of approximately −52° relative to horizontal (0°). As can be seen at these angular orientations, the mounting flanges 310a, 310b, 310c, and 310d do not interfere with or obstruct the PV module 316. While +/−52° is illustrated in FIG. 3A, other extents of rotational travel may also be possible depending on the configuration of the components.

In some embodiments, in order to prevent potential obstruction with a PV module by the mounting flanges, the connection interface between upper and lower components of a bifurcated bearing housing and/or the connection interface between a bearing housing and a support structure (or brackets of a support structure) may lie on one or more planes that are lower than a centerpoint of an aperture defined by a bearing housing, or an axis of rotation of a rotating bearing and/or torque tube. In FIGS. 3A and 3B, the plane 318 on which the connection interface between upper and lower components of the bearing housing 306 lies is below the centerpoint 319, as well as the axis of rotation of the torque tube 314 and the rotating bearing 308. Similarly, the plane 320 on which the connection interface between the bearing housing 306 and the brackets 304 lies is also below the centerpoint 319, as well as the axis of rotation of the torque tube 314 and the rotating bearing 308. Neither of these planes intersect the aperture defined by the bearing housing, the rotating bearing 308, or the torque tube 314.

Depending on the angular orientations required for a PV module, a mounting flange(s) could be positioned at any distance from the centerpoint 319. For example, mounting flange(s) could be spaced sufficiently below the centerpoint 319 to allow a PV module to be oriented at ±55°, ±60°, or more relative to horizontal (0°).

Turning back to FIGS. 2A-2F, the upper component 206 and the lower component 208 may include one or more structural ridges 222a-222q. These structural ridges may provide increased structural rigidity and strength to avoid deformation and/or damage to the bearing housing 202 when undergoing loads from rotating the torque tube, when high winds are present, or in other high-stress situations on the bearing housing 202. For example, these structural ridges 222a-222q maintain the circular profile of the bearing housing 202 much better than a bearing housing that lacks structural ridges.

In some embodiments, the first aperture defining portion 210a may include structural ridges 222a, 222b, 222c, and 222d. The structural ridges 222a, 222b, 222c, and 222d may run parallel with each other and an edge of the first aperture defining portion 210a. The structural ridges 222a, 222b, 222c, and 222d may run for the majority of the span of the first aperture defining portion 210a. In some embodiments, structural ridges 222a, 222b, 222c, and 222d may run generally parallel to each other in the longitudinal direction. For example, if the first aperture defining portion 210a were flattened into the same plane as the mounting flanges 214a and 214b, each of the structural ridges 222a, 222b, 222c, and 222d may run generally parallel to each other.

In some embodiments, one or more of the structural ridges 222a, 222b, 222c, and 222d may laterally overlap adjacent structural ridges. For example, structural ridge 222c laterally overlaps with portions of, but not the entirety of, adjacent structural ridges 222a and 222b.

In some embodiments, the second aperture defining portion 210b may include structural ridges 222e, 222f, and 222g. The structural ridges 222e, 222f, and 222g may run parallel with each other and an edge of the second aperture defining portion 210b. The structural ridges 222e, 222f, and 222g may run for the majority of the span of the second aperture defining portion 210b. In some embodiments, structural ridges 222e, 222f, and 222g may run generally parallel to each other in the longitudinal direction. For example, if the second aperture defining portion 210b were flattened into the same plane as the mounting flanges 214c and 214d, each of the structural ridges 222e, 222f, and 222g may run generally parallel to each other. In some embodiments, one or more of the structural ridges 222e, 222f, and 222g may laterally overlap adjacent structural ridges.

In some embodiments, the mounting flanges 214a, 214b, 214c, and 214d may also include structural ridges. For example, the first mounting flange 214a may include structural ridges 222h and 222i. The second mounting flange 214b may include structural ridges 222j and 222k. The third mounting flange 214c may include structural ridges 222m and 222n. The fourth mounting flange 214d may include structural ridges 222p and 222q.

Structural ridges 222h, 222i, 222j, 222k, 222m, 222n, 222p, and 222q may have sizes and shapes such that when the upper and lower components 206 and 208 are in an attached configuration, the structural ridges 222h, 222i, 222j, and 222k on the upper component 206 align with corresponding structural ridges 222m, 222n, 222p, and 222q on the lower component 208 to allow a flush interface between the upper and lower components 206 and 208. Specifically, the structural ridge 222m may have a shape that interfaces with (or fits inside of) the structural ridge 222h. The structural ridge 222n may have a shape that interfaces with (or fits inside of) the structural ridge 222i. The structural ridge 222p may have a shape that interfaces with (or fits inside of) the structural ridge 222j. The structural ridge 222q may have a shape that interfaces with (or fits inside of) the structural ridge 222k. In addition to providing increased structural rigidity, the structural ridges 222h, 222i, 222j, 222k, 222m, 222n, 222p, and 222q may provide guides to rapidly align the upper component 206 and the lower component 208 during installation.

In some embodiments, all of the structural ridges 222 may be of a similar dimension in cross-section (e.g., the ridge is approximately the same height relative to the surrounding surface). For example, the structural ridges 222 may each include a comparable or similar height relative to the flat surfaces around the ridges. In other embodiments, the structural ridges may have different dimensions in cross-section, shape, and size. For example, in some embodiments, structural ridges may not run parallel to each other. Additionally, any number of structural ridges may be included on a bearing housing.

In some embodiments, the upper and lower components 206 and 208 of bifurcated bearing housing 202 may include transition portions between the mounting flanges and the aperture defining portions. Specifically, the upper component 206 may include a first transition portion 226a between the first mounting flange 214a and the first aperture defining portion 210a. The upper component 206 may include a second transition portion 226b between the second mounting flange 214b and the first aperture defining portion 210a. The lower component 208 may include a third transition portion 226c between the third mounting flange 214c and the second aperture defining portion 210b. The lower component 208 may include a fourth transition portion 226d between the fourth mounting flange 214d and the second aperture defining portion 210b.

In some embodiments, gussets 230a, 230b, 230c, and 230d may be included at transition portions 226a, 226b, 226c, and 226d, respectively, to further provide additional structural support and/or rigidity to the bifurcated bearing housing 202. The gussets 230a, 230b, 230c, and 230d may act as braces at the corners of transition portions 226a, 226b, 226c, and 226d. The gussets 230a, 230b, 230c, and 230d may connect a mounting flange and an aperture defining portion through a diagonal or other non-90° interface.

Gussets 230a, 230b, 230c, and 230d may have sizes and shapes such that when the upper and lower components 206 and 208 are in an attached configuration, the gussets 230a and 230b on the upper component 206 align with corresponding gussets 230c and 230d on the lower component 208 to allow a flush interface between the upper and lower components 206 and 208. Specifically, the gusset 230c may have a shape that interfaces with (or fits inside of) the gusset 230a. The gusset 230d may have a shape that interfaces with (or fits inside of) the gusset 230b. In addition to providing increased structural rigidity, the gussets 230a, 230b, 230c, and 230d may provide guides to rapidly align the upper component 206 and the lower component 208 during installation. In some embodiments, a bearing housing may include one or more gussets on one or both sides of a lower component but not an upper component. Alternatively, a bearing housing may include one or more gussets on one or both sides of an upper component but not a lower component.

In some embodiments, within the rotating bearing 204 may include a stop 234, which may be used to limit a degree of rotation of a torque tube that is fixedly coupled to the rotating bearing 204. In these embodiments, the aperture defining portion 210a may include a slot 236 to accommodate the stop 234. The stop 234 may be fixedly coupled to a torque tube and act as a limiter on the extremes of rotation by the torque tube within the bifurcated bearing housing 202. In some embodiments, the stop 234 and slot 236 may be configured to prevent rotation by a torque tube that would create interference between a PV module and one or more of the mounting flanges 214a, 214b, 214c, and 214d. In other embodiments, a rotating bearing may lack a stop that limits a degree of rotation of a torque tube.

In some embodiments, the upper and lower components 206 and 208 may be selectively attached to each other. Any suitable mechanism may be used to selectively attach the upper and lower components 206 and 208 together. For example, in the bifurcated bearing housing 202, bolts 240a and 240b and nuts 242a and 242b are used to attach the upper and lower components 206 and 208.

In some embodiments, the mounting flanges 214a-214d may include one or more holes for mounting the bifurcated bearing housing 202 to a support structure, such as the pile 102 in FIG. 1 via the brackets 104. Specifically, the mounting flange 210a may include a hole 250a, the mounting flange 210b may include a hole 250b, the mounting flange 210c may include a hole 250c, and the mounting flange 210d may include a hole 250d. In some embodiments, these holes may be elongated slots that allow for positional flexibility when mounting to brackets, such as the brackets 104 in FIG. 1. As can be seen in FIGS. 2A, 2E, and 2F, when the upper and lower components 206 and 208 are in an attached configuration, the hole 250a aligns with the hole 250c, and the hole 250b aligns with the hole 250d.

In some embodiments, fasteners, such as a bolt or screw, may extend through the holes 250a-250d to physically secure the bearing housing 202 to a support structure. In some embodiments, one or more of the holes 250a-250d may include slots which may facilitate the use of the bearing housing 202 with different sizes and/or configurations of support structures and/or allow for adjustment of the bearing housing 202 in situations where support structures are not perfectly aligned.

By using a bifurcated bearing housing 202, if there is damage, maintenance, or replacement that needs to happen with the bearing housing 202 and/or the rotating bearing 204, embodiments of the present disclosure may permit access to such components without completely disassembling the PV modules from the entire length of a torque tube and removing each of the successive bearing housings along the length of the torque tube until the bearing housing at issue is reached. This is particularly problematic for those components towards the middle of the torque tube. Instead of disassembling the entire assembly to get to the bearing housing at issue, the upper component 206 may be removed, granting access to the stop 234, the rotating bearing 204, and/or complete removal of the bearing housing 202. Additionally, even for circumstances in which only a subset of the bearing housings is removed to reach an intermediate coupler along the length of the torque tube, embodiments of the present disclosure can still reduce the effort, expense, and difficulty in removing even the subset of the bearing housings along the length of the torque tube.

Figure 4A:
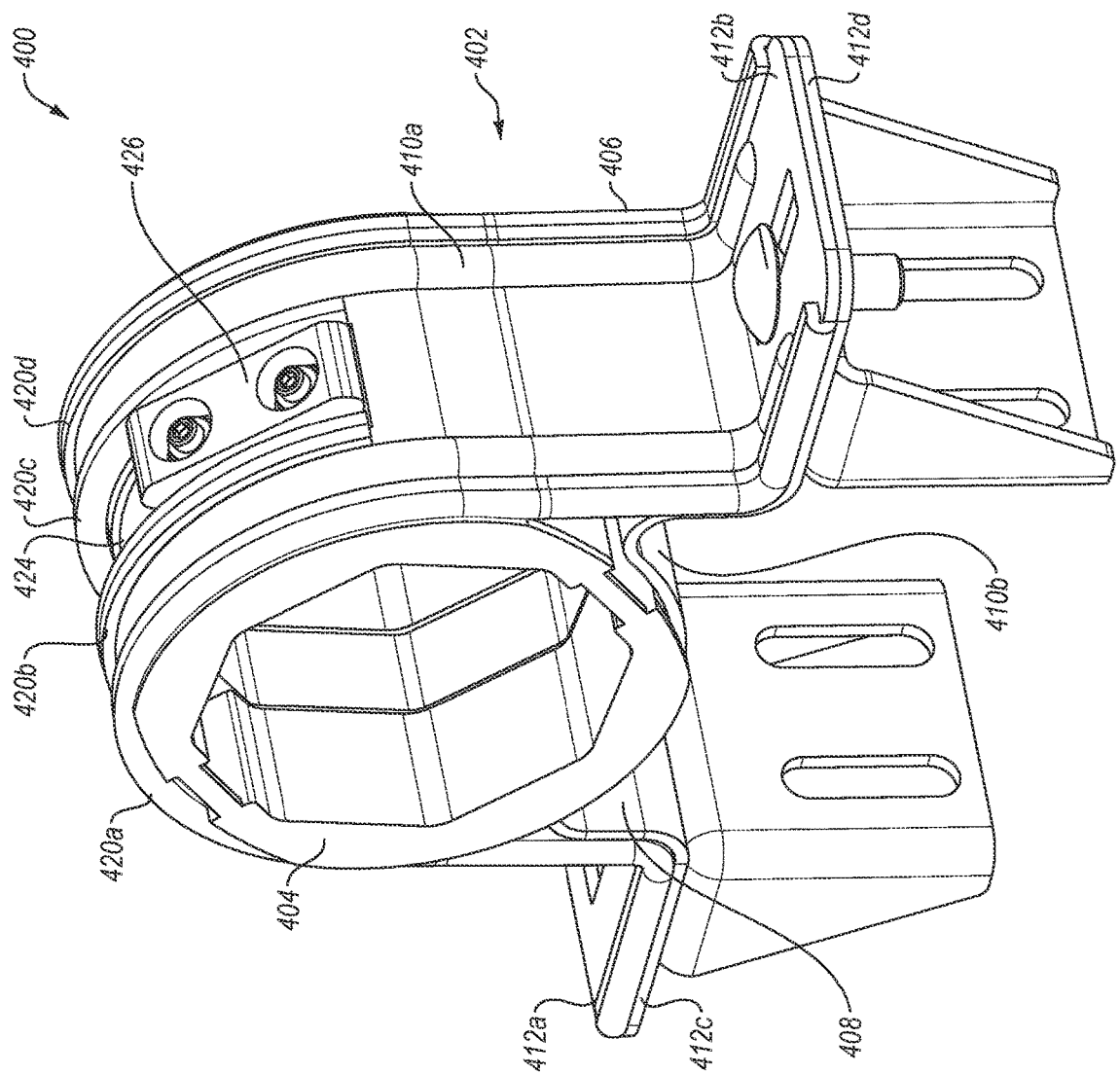
FIGS. 4A-4C illustrate various views of a torque tube interface having one or more hems.
Figure 4B:
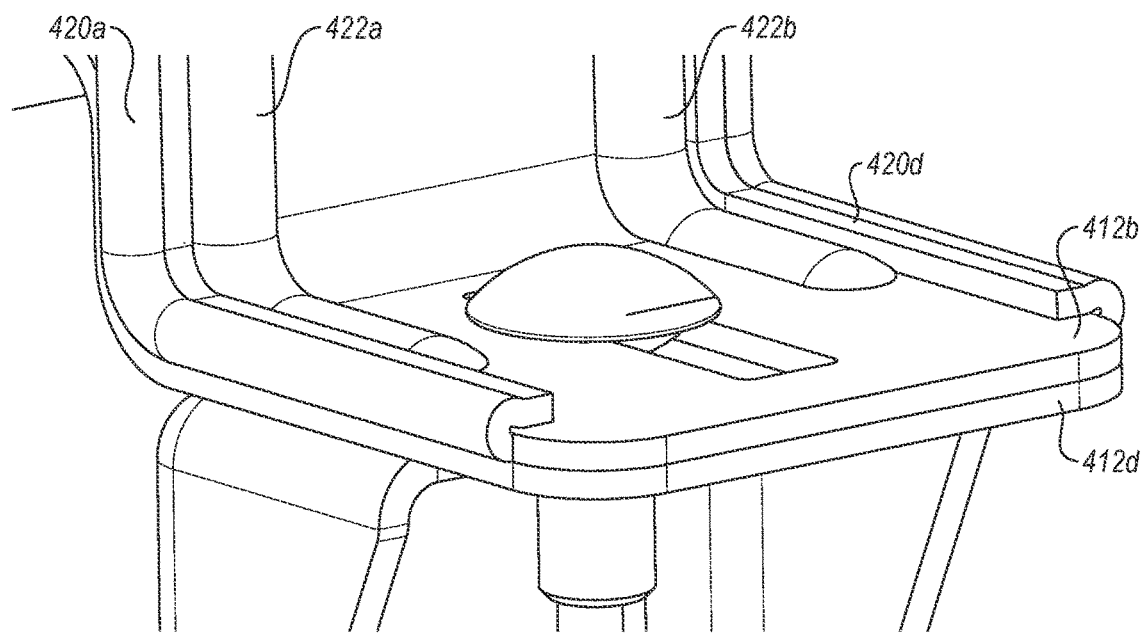
Figure 4C:
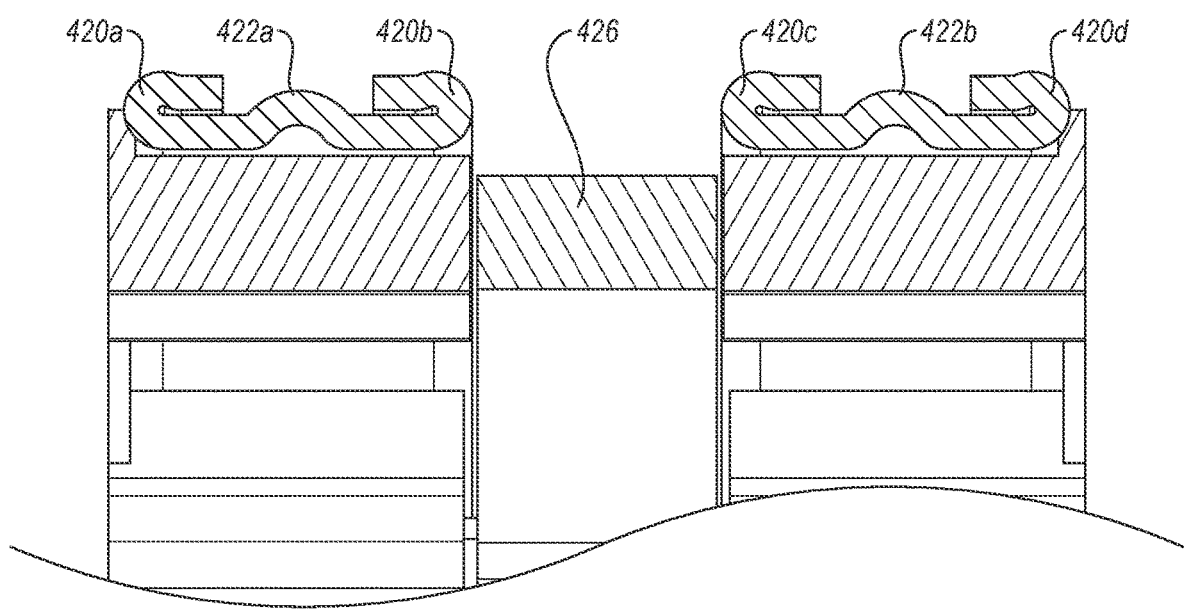

FIGS. 4A-4C illustrate various views of a torque tube interface 400. Similar to the torque tube interfaces 200 and 300, the torque tube interface 400 includes a bifurcated bearing housing 402 that is configured to secure a rotating bearing 404. The bifurcated bearing housing 402 includes upper and lower components 406 and 408. The upper component 406 of bearing housing 402 includes a first aperture defining portion 410a. The lower component 408 of bearing housing 402 includes a second aperture defining portion 410b. The bifurcated bearing housing 402 also includes mounting flanges 412a, 412b, 412c, and 412d.

Additional structural support and/or rigidity is provided to the bifurcated bearing housing 402 through hems 420a, 420b, 420c, and 420d. For example, hems 420a and 420d may be formed along outer edges of the upper component 406. Any hem type may be used. In some embodiments, a flat hem, an open hem, a rolled hem, a teardrop hem, a rope hem, or another type of hem may be used. For example, in some embodiments a hem may include an angular bend, such as a bend of approximately 90°, at an edge of a material. Hems 420b and 420c may be formed along a slot 424 that accommodates a stop 426, which limits rotation of the rotating bearing 404. Similar hems may be formed in the edges of the lower component 408.

The hems may run in the longitudinal direction along all or part of the first aperture defining portion 410a and the mounting flanges 412a and 412b of the upper component 406. The hems may run in the longitudinal direction along all or part of the second aperture defining portion 410b and the mounting flanges 412c and 412d of the lower component 408. Hems 420b and 420c are formed in edges of the slot 424. For example, FIG. 4C illustrates a cross sectional view of the top of first aperture defining portion 410a. In addition to hems 420a, 420b, 420c, and 420d, first and section structural ridges 422a and 422b are also formed to provide additional structural support and rigidity.

Figure 5:
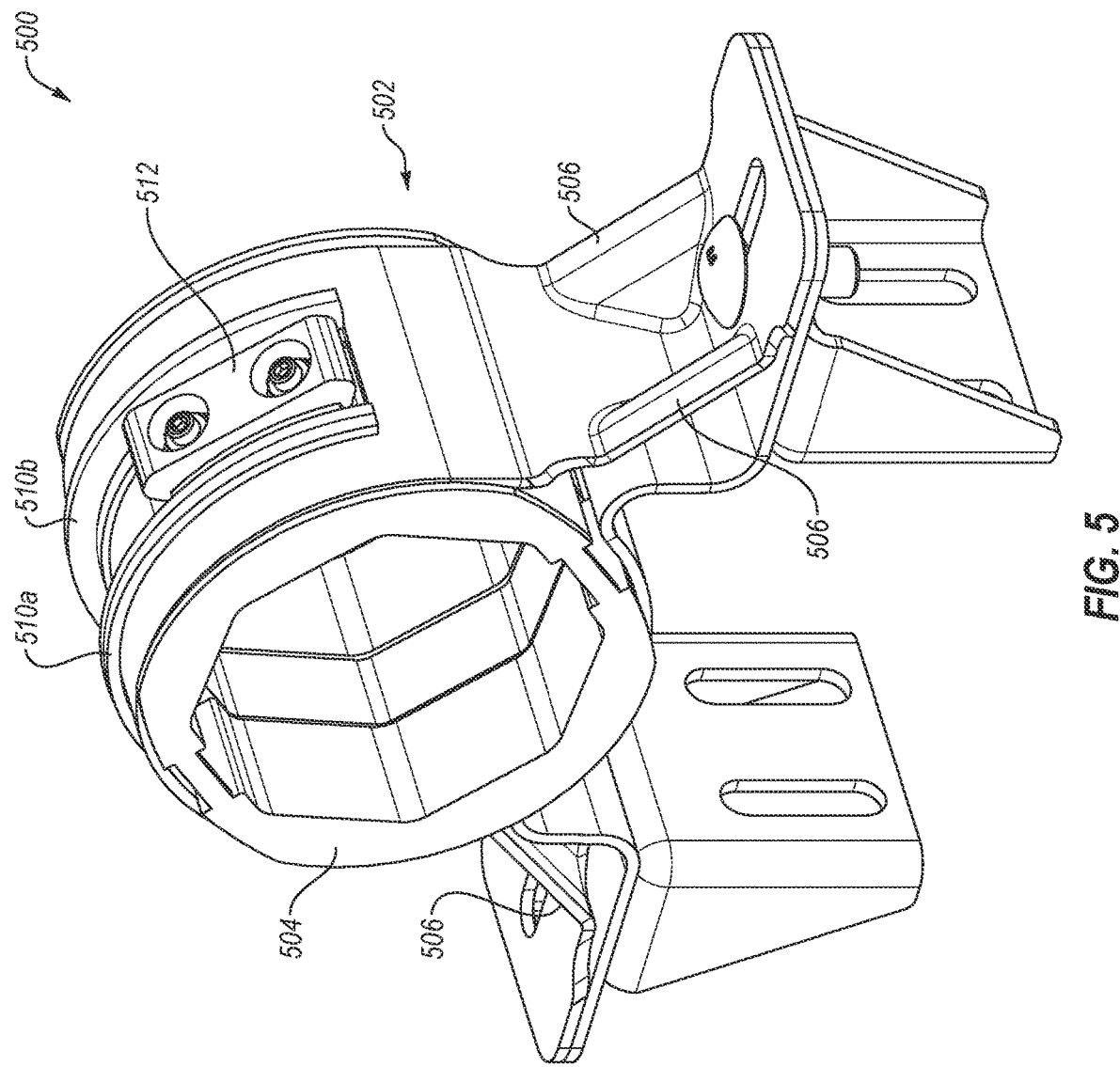
FIG. 5 illustrates a torque tube interface having structural elements that provide additional support and rigidity.

FIG. 5 illustrates a perspective view of a torque tube interface 500, which includes a bifurcated bearing housing 502 and rotating bearing 504. An upper component of the bifurcated bearing housing 502 includes gussets 506. However, a lower component of the bifurcated bearing housing 502 lacks gussets. The bifurcated bearing housing 502 also includes hems 510a and 510b, which are formed on edges of a slot in which a limiter 512 rotates.

Figure 6:
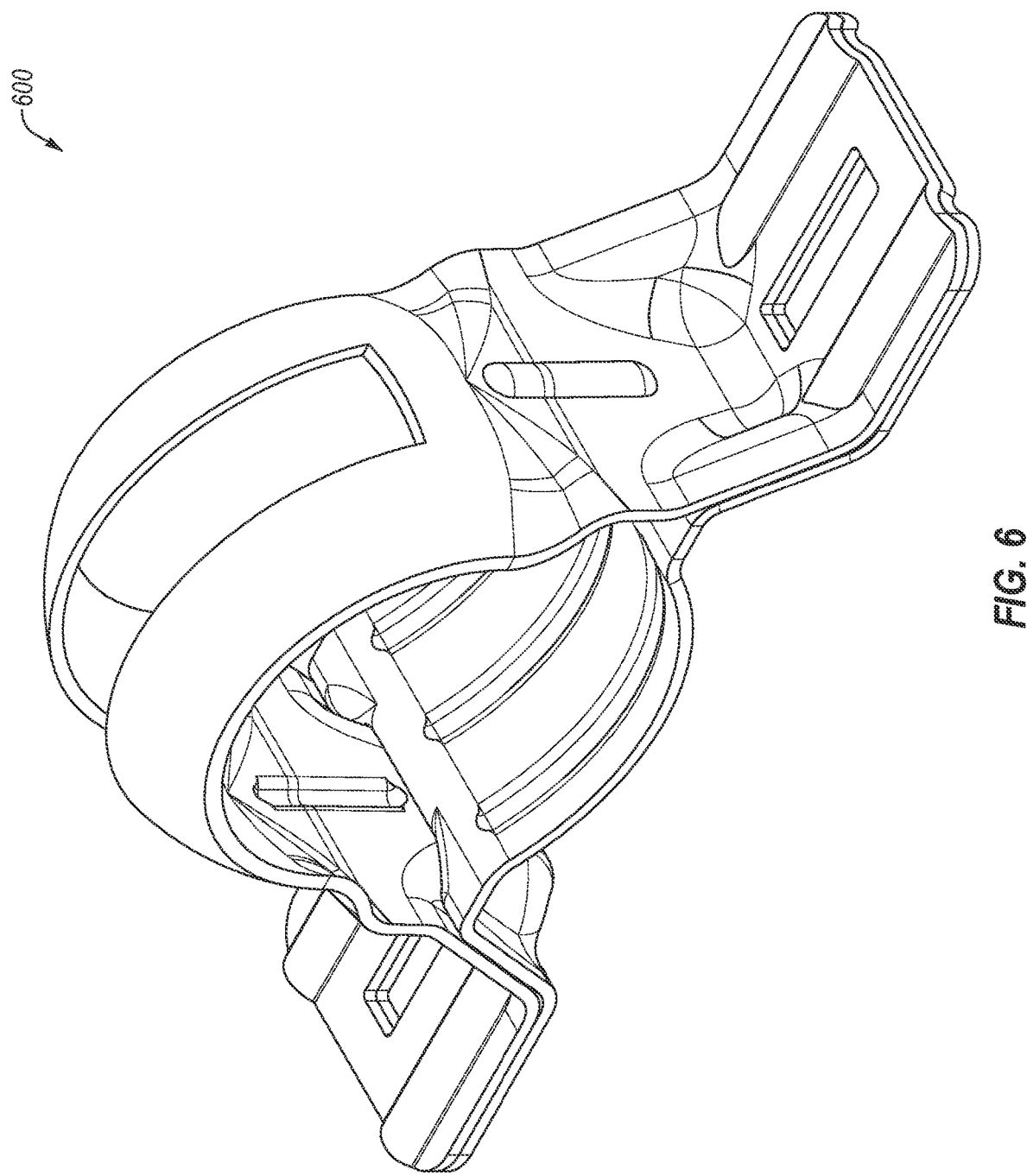
FIG. 6 illustrates a bifurcated bearing housing that is configured to accommodate a spherical rotating bearing.

FIG. 6 illustrates a perspective view of a bifurcated bearing housing 600. The bifurcated bearing housing 600 includes an upper component and a lower component that define an aperture for a rotating bearing (not shown). The aperture formed by the bifurcated bearing housing 600 is spherical in shape to accommodate a spherical shaped rotating bearing. Use of a spherical shaped rotating bearing may provide greater tolerances for uneven ground or misalignments between the ground and a torque tube. Use of a spherical shaped rotating bearing may also provide greater flexibility in installation tolerances of piles and adaptation for unstable or heave-prone ground, where the pile height or position may change over time.

With the variations illustrated herein, it will be apparent that any of the feature included herein are optional and may be combined in any way. For example, the presence or absence of any of the structural ridges, the presence or absence of any of the gussets, the presence or absence of the hems, the presence or absence of the slot for the stop, among others, are all contemplated within the present disclosure, in any combination. For example, in some embodiments, a bearing housing may include gussets and hems, but no structural ridges. In another embodiment, gussets alone may be used, etc.

What is claimed is:

1. A bifurcated bearing housing for mounting photovoltaic (PV) modules to a support structure in a solar tracking system comprising:
    a first component defining a first portion of an aperture configured to house a first portion of a rotating bearing, wherein:
        the first component includes a first structural ridge and a second structural ridge,
        the first and second structural ridges run in longitudinal directions that would be approximately parallel if the first component was flattened into a single plane, and
        the second structural ridge laterally overlaps a portion, but not the entirety, of the first structural ridge;
    a second component defining a second portion of the aperture configured to house a second portion of the rotating bearing; and
    a connection interface between the first and second components, wherein, when the first and second components are in an attached configuration, the connection interface lies on a plane that is below a centerpoint of the aperture defined by the first and second components.

2. The bifurcated bearing housing of claim 1, wherein:
    the first component includes a first mounting flange,
    the second component includes a second mounting flange, and
    the connection interface is between a bottom surface of the first mounting flange and a top surface of the second mounting flange.

3. The bifurcated bearing housing of claim 2, wherein the first and second mounting flanges extend laterally away from the aperture defined by the first and second components.

4. The bifurcated bearing housing of claim 2, wherein:
    the first mounting flange includes a first hole,
    the second mounting flange includes a second hole, and
    when the first and second components are in the attached configuration, the first hole aligns with the second hole.

5. The bifurcated bearing housing of claim 4, wherein:
    the first mounting flange includes a first structural ridge,
    the second mounting flange includes a second structural ridge, and
    the first and second structural ridges have sizes and shapes such that when the first and second components are in an attached configuration, the first and second structural ridges align to allow a flush interface between a bottom surface of the first mounting flange and a top surface of the second mounting flange.

6. The bifurcated bearing housing of claim 1, wherein at least a portion of an edge of the first component includes a hem that is shaped to provide additional structural rigidity to the first component.

7. The bifurcated bearing housing of claim 1, wherein:
    the bifurcated bearing housing is configured to be secured to a bracket at a connection interface between the bifurcated bearing housing and the bracket, and
    the connection interface between the bearing housing and the bracket lies on a plane that does not intersect the aperture defined by the first and second components.

8. The bifurcated bearing housing of claim 1, wherein:
    the first component includes a first mounting flange,
    the second component includes a second mounting flange, and
    at least one of the first and second components includes a gusset shaped to provide additional structural rigidity to the bifurcated bearing housing.

9. The bifurcated bearing housing of claim 1, wherein the connection interface lies on a plane that does not intersect the aperture defined by the first and second components.

10. A bifurcated bearing housing for mounting photovoltaic (PV) modules to a support structure in a solar tracking system comprising:
    an upper component including a first mounting flange and a first aperture defining portion;
    a lower component including a second mounting flange and a second aperture defining portion, wherein the upper component is selectively attachable to the lower component and when in an attached configuration:
        the upper and lower components define an aperture that is configured to house a rotating bearing, and
        a bottom surface of the first mounting flange interfaces with a top surface of the second mounting flange on a plane that is below a centerpoint of the aperture defined by the upper and lower components; and
    a first gusset at a transition between the first mounting flange and the first aperture defining portion, the gusset being shaped to provide additional structural rigidity at the transition between the first mounting flange and the first aperture defining portion.

11. The bifurcated bearing housing of claim 10, wherein:
    the first mounting flange includes a first hole;
    the second mounting flange includes a second hole; and
    when the upper and lower components of the bearing housing are in an attached configuration, the first and second holes align.

12. The bifurcated bearing housing of claim 10, wherein the bottom surface of the first mounting flange interfaces with the top surface of the second mounting flange on a plane that does not intersect the aperture defined by the upper and lower components.

13. The bifurcated bearing housing of claim 10, wherein the first aperture defining portion includes a first structural ridge.

14. The bifurcated bearing housing of claim 13, wherein:
    the first aperture defining portion includes a second structural ridge, and the first and second structural ridges run in longitudinal directions that would be approximately parallel if the first aperture defining portion was flattened into a single plane.

15. The bifurcated bearing housing of claim 14, wherein the second structural ridge laterally overlaps a portion, but not the entirety, of the first structural ridge.

16. The bifurcated bearing housing of claim 10, wherein:
the first mounting flange includes a first structural ridge;
the second mounting flange includes a second structural ridge, and
the first and second structural ridges have sizes and shapes such that when the upper and lower components of the bearing housing are in the attached configuration, the first and second structural ridges align to allow a flush interface between the bottom surface of the first mounting flange and the top surface of the second mounting flange.

17. The bifurcated bearing housing of claim 10, further comprising a second gusset at a transition between the second mounting flange and the second aperture defining portion, wherein the first and second gussets have sizes and shapes such that when the upper and lower components of the bearing housing are in the attached configuration, the first and second gussets align to allow a flush interface between the upper component and the lower component.

18. A bifurcated bearing housing for mounting photovoltaic (PV) modules to a support structure in a solar tracking system comprising:
an upper component, the upper component comprising:
a first mounting flange;
a second mounting flange; and
a first aperture defining portion spanning between the first and the second mounting flanges that is configured to house at least a first portion of a rotating bearing; and
a lower component that is selectively attachable to the upper component, the lower component comprising:
a third mounting flange;
a fourth mounting flange; and
a second aperture defining portion spanning between the third and the fourth mounting flanges that is configured to house at least a second portion of the rotating bearing,
wherein when the upper and lower components of the bearing housing are in an attached configuration and an aperture is defined by the first and second aperture defining portions:
a bottom surface of the first mounting flange interfaces with a top surface of the third mounting flange along a first plane and a bottom surface of the second mounting flange interfaces with a top surface of the fourth mounting flange along a second plane, and
the first and second planes are on a same side of the aperture.

19. The bifurcated bearing housing of claim 18, wherein the first aperture defining portion includes a first structural ridge.

20. The bifurcated bearing housing of claim 19, wherein:
the first aperture defining portion includes a second structural ridge, and
the first and second structural ridges run in longitudinal directions that would be approximately parallel if the first aperture defining portion was flattened into a single plane.

21. The bifurcated bearing housing of claim 20, wherein the second structural ridge laterally overlaps a portion, but not the entirety, of the first structural ridge.

22. The bifurcated bearing housing of claim 18, wherein the first, second, third, and fourth mounting flanges extend laterally away from the aperture defined by the first and second aperture defining portions.

23. The bifurcated bearing housing of claim 18, wherein:
the first mounting flange includes a first structural ridge,
the third mounting flange includes a second structural ridge, and
the first and second structural ridges have sizes and shapes such that when the upper and lower components are in an attached configuration, the first and second structural ridges align to allow a flush interface between the bottom surface of the first mounting flange and the top surface of the third mounting flange.

24. The bifurcated bearing housing of claim 23, wherein:
the second mounting flange includes a third structural ridge,
the fourth mounting flange includes a fourth structural ridge, and
the third and fourth structural ridges have sizes and shapes such that when the upper and lower components are in an attached configuration, the third and fourth structural ridges align to allow a flush interface between the bottom surface of the second mounting flange and the top surface of the fourth mounting flange.

25. The bifurcated bearing housing of claim 18, wherein at least a portion of an edge of the first component includes a hem that is shaped to provide additional structural rigidity to the first component.

26. The bifurcated bearing housing of claim 18, wherein the upper component includes a first gusset at a transition between the first mounting flange and the first aperture defining portion and a second gusset at a transition between the second mounting flange and the first aperture defining portion, the first and second gussets being shaped to provide additional structural rigidity to the bifurcated bearing housing.

27. The bifurcated bearing housing of claim 18, wherein the lower component includes a first gusset at a transition between the third mounting flange and the second aperture defining portion and a second gusset at a transition between the fourth mounting flange and the second aperture defining portion, the first and second gussets being shaped to provide additional structural rigidity to the bifurcated bearing housing.

* * * * *